(12) United States Patent
Yajima et al.

(10) Patent No.: US 6,805,720 B1
(45) Date of Patent: Oct. 19, 2004

(54) ELECTRODE AND GEL ELECTROLYTE CELL PRODUCTION METHOD

(75) Inventors: Etsushi Yajima, Fukushima (JP); Tsuyoshi Sugiyama, Miyagi (JP); Kazuhiko Soji, Fukushima (JP)

(73) Assignee: Sony Corporation, Tokyo (JP)

( * ) Notice: Subject to any disclaimer, the term of this patent is extended or adjusted under 35 U.S.C. 154(b) by 117 days.

(21) Appl. No.: 09/708,911

(22) Filed: Nov. 8, 2000

(30) Foreign Application Priority Data

Nov. 9, 1999 (JP) .......................................... P11-318434

(51) Int. Cl.[7] .......................... H01M 6/00; H01M 6/12; H01M 6/46; H01M 6/14
(52) U.S. Cl. ........................ 29/623.5; 429/162; 429/300
(58) Field of Search ................................ 429/162, 185, 429/179, 300; 29/623.1, 623.6, 623.5

(56) References Cited

U.S. PATENT DOCUMENTS

| | | | |
|---|---|---|---|
| 5,538,814 A | * 7/1996 | Kamauchi et al. | 429/218 |
| 5,609,974 A | * 3/1997 | Sun | 429/192 |
| 5,639,573 A | * 6/1997 | Oliver et al. | 429/190 |
| 5,665,265 A | * 9/1997 | Gies et al. | 252/62.2 |
| 5,925,283 A | * 7/1999 | Taniuchi et al. | 252/62.2 |
| 6,114,068 A | * 9/2000 | Yamada et al. | 429/300 |
| 6,277,516 B1 | * 8/2001 | Sasaki et al. | 429/162 |
| 6,316,142 B1 | * 11/2001 | Delnick et al. | 429/217 |
| 6,376,128 B1 | * 4/2002 | Goto | 429/304 |

* cited by examiner

*Primary Examiner*—Patrick Ryan
*Assistant Examiner*—Julian Mercado
(74) *Attorney, Agent, or Firm*—Sonnenschein, Nath & Rosenthal LLP (57) ABSTRACT

The present invention provides an electrode production method for producing an electrode including a rectangular electrode carrier and a gel electrolyte film formed on the electrode carrier and having a width greater than the electrode carrier. The method includes: an overlaying step for overlaying a first carrier having a greater width than the gel electrolyte film, a second carrier having a width approximately identical to that of the gel electrolyte film, and the electrode carrier in this order; a coating step for applying an electrolyte composition onto the first carrier, the second carrier, and the electrode carrier in such a manner that the applied electrolyte composition has a width greater than the width of the second carrier and smaller than the width of the first carrier; a first peel-off step for peeling off from the first carrier the second carrier and the electrode carrier; a gelatinization step for gelatinizing the electrolyte composition into a gel electrolyte film; and a second peel-off step for peeling off from the second carrier the gel electrolyte film and the electrode carrier. Thus, the gel electrolyte film can be formed on the electrode with a high accuracy.

18 Claims, 9 Drawing Sheets

ELECTRODE AND GEL ELECTROLYTE CELL PRODUCTION METHOD

BACKGROUND OF THE INVENTION

The present application claims priority to Japanese Application No. P11-318434 filed Nov. 9, 1999, which application is incorporated herein by reference to the extent permitted by law.

1. Field of the Invention

The present invention relates to production method of an electrode including an electrode carrier and a gel electrolyte film formed on the electrode carrier and having a larger width than the electrode carrier and a production method of a gel electrolyte cell having such an electrode.

2. Description of the Prior Art

Recently various portable electronic apparatuses such as a tape recorder provided with a camera, a cellular telephone, and a portable computer are used and it has been desired to reduce their weight and size. Accordingly, it is also desired to reduce size and weight of cells used as a power source of these electronic apparatuses. To cope with this, a lithium-ion cell has been developed and industrialized. This cell uses a porous polymer separator impregnated in an electrolyte solution as the ion conductor between the positive electrode and negative electrode. In order to prevent leak of the electrolyte solution, the cell is packaged in a heavy metal package.

On the other hand, a great expectation is posed on a solid electrolyte cell using a solid electrolyte as the ion conductor between the positive electrode and negative electrode which has no danger of liquid leak and can be placed in a simplified package to reduce the size and weight of the cell. Especially great attention is paid to a solid polymer electrolyte having lithium salt dissolved in a polymer and a gel-like solid electrolyte containing electrolyte in a matrix polymer (hereinafter, referred to as a gel electrolyte).

A gel electrolyte cell using such a gel electrolyte can be produced as follows.

Firstly, for the positive electrode, a positive electrode composite agent containing a positive electrode active material, conductive agent, and a binder is uniformly applied onto both surfaces of a positive electrode collector and dried so as to form a positive electrode active material layer, which is dried and pressed by a roll press so as to obtain a positive electrode sheet.

Next, for the negative electrode, a negative electrode composite agent containing a negative electrode active material and a binder is uniformly applied onto both surfaces of a negative electrode collector and dried to form a negative electrode active material layer, which is dried and pressed by a roll press so as to obtain a negative electrode sheet.

As for the gel electrolyte film, a sol electrolyte solution containing a non-aqueous solvent, electrolyte salt, and matrix polymer is uniformly applied onto both surfaces of the positive electrode sheet and the negative electrode sheet and dried to remove the solvent. Thus, a gel electrolyte film is formed on the positive electrode active material layer and the negative electrode active material layer.

The positive electrode sheet having the gel electrolyte film is, for example, cut into a strip. Furthermore, the gel electrolyte film and the positive electrode active material layer of the portion for a positive electrode lead welding is removed from the surface of the positive electrode collector, and the positive electrode lead is welded here, so as to obtain a strip positive electrode having the gel electrolyte film.

Moreover, the negative electrode sheet having the gel electrolyte film is, for example, cut into a strip. Furthermore, the gel electrolyte film and the negative electrode active material layer of the portion for a negative electrode lead welding is removed from the surface of the negative electrode collector, and the negative electrode lead is welded here, so as to obtain a strip negative electrode having the gel electrolyte film.

Lastly, the strip positive electrode and the strip negative electrode each having the gel electrolyte film are laid upon one another and the layered body is rolled in the longitudinal direction by several turns so as to obtain a rolled electrode body. This rolled electrode body is sandwiched by exterior films, whose outermost peripheries are heat-sealed under a reduced pressure so that the rolled electrode body is airtightly sealed in the exterior films to complete the gel electrolyte cell.

In the rolled type gel electrolyte secondary cell having the aforementioned configuration, the gel electrolyte film formed on the electrode surface is defined so as to have a larger width than the electrode so as to improve reliability of the operation of the cell.

In order to obtain the aforementioned width of the gel electrolyte film, various trials have been made to increase the dimensional accuracy of the gel electrolyte coating apparatus and the accuracy of the coating position. However, due to the gel viscosity fluctuations and the porosity and the surface roughness fluctuations of the electrode to which the gel electrolyte is to be applied, it is difficult to obtain a stable dimensional accuracy of the gel electrolyte film. The gel electrolyte film often has a too large width to be placed in a package when assembling the cell or too small width, causing a short circuit between the positive electrode and the negative electrode.

Moreover, in order to solve this problem, there is a method to form the gel electrolyte film having a sufficiently larger width than the electrode and then cut off an excessive portion of the gel electrolyte film using a roller cutter or removed using a brush or scraper. However, this has caused various problems such that a portion of the gel electrolyte film to be left is removed or a portion of the gel electrolyte film which has been cut off is mixed into the cell, lowering the yield.

SUMMARY OF THE INVENTION

It is therefore an object of the present invention to provide an electrode production method and a gel electrolyte cell production method capable of forming a gel electrolyte film on the electrode with a stable high accuracy.

The electrode production method according to the present invention is for producing an electrode including a rectangular electrode carrier and a gel electrolyte film formed on the electrode carrier and having a width greater than the electrode carrier, the method including: an overlaying step for overlaying a first carrier having a greater width than the gel electrolyte film, a second carrier having a width approximately identical to that of the gel electrolyte film, and the electrode carrier in this order; a coating step for applying an electrolyte composition onto the first carrier, the second carrier, and the electrode carrier which have been put upon one another, in such a manner that the applied electrolyte composition has a width greater than the width of the second carrier and smaller than the width of the first carrier; a first peel-off step for peeling off from the first carrier the second carrier and the electrode carrier coated with the gel electrolyte composition in the coating step and overlaid on each other; a gelatinization step for gelatinizing into a gel electrolyte film the electrolyte composition applied onto the second carrier and the electrode carrier which have been peeled off from the first carrier in the first peel-off step, and a second peel-off step for peeling off from the second carrier the gel electrolyte film and the electrode carrier.

In the aforementioned electrode production method according to the present invention utilizing the difference in adhesion between the first carrier, the second carrier, and the electrode carrier with the electrolyte composition or the gel electrolyte film, the gel electrolyte film is formed on the electrode carrier with a high accuracy without peeling off of the gel electrolyte film from the electrode carrier.

Moreover, the gel electrolyte cell production method uses an electrode including a rectangular electrode carrier and a gel electrolyte film formed on the electrode carrier and having a width greater than the electrode carrier, the electrode being produced by: an overlaying step for overlaying a first carrier having a greater width than the gel electrolyte film, a second carrier having a width approximately identical to that of the gel electrolyte film, and the electrode carrier in this order; a coating step for applying an electrolyte composition onto the first carrier, the second carrier, and the electrode carrier which have been put upon one another, in such a manner that the applied electrolyte composition has a width greater than the width of the second carrier and smaller than the width of the first carrier; a first peel-off step for peeling off from the first carrier the second carrier and the electrode carrier coated with the gel electrolyte composition and overlaid on each other; a gelatinization step for gelatinizing into a gel electrolyte film the electrolyte composition applied onto the second carrier and the electrode carrier which have been peeled off from the first carrier in the first peel-off step; and a second peel-off step for peeling off from the second carrier the gel electrolyte film and the electrode carrier.

In the aforementioned gel electrolyte cell production method according to the present invention utilizing the difference in adhesion between the first carrier, the second carrier, and the electrode carrier with the electrolyte composition or the gel electrolyte film, the gel electrolyte film is formed on the electrode carrier with a high accuracy without peeling off of the gel electrolyte film from the electrode carrier.

DETAILED DESCRIPTION OF PREFERRED EMBODIMENTS

Description will now be directed to a preferred embodiment with reference to the attached drawings.

Figure 1:
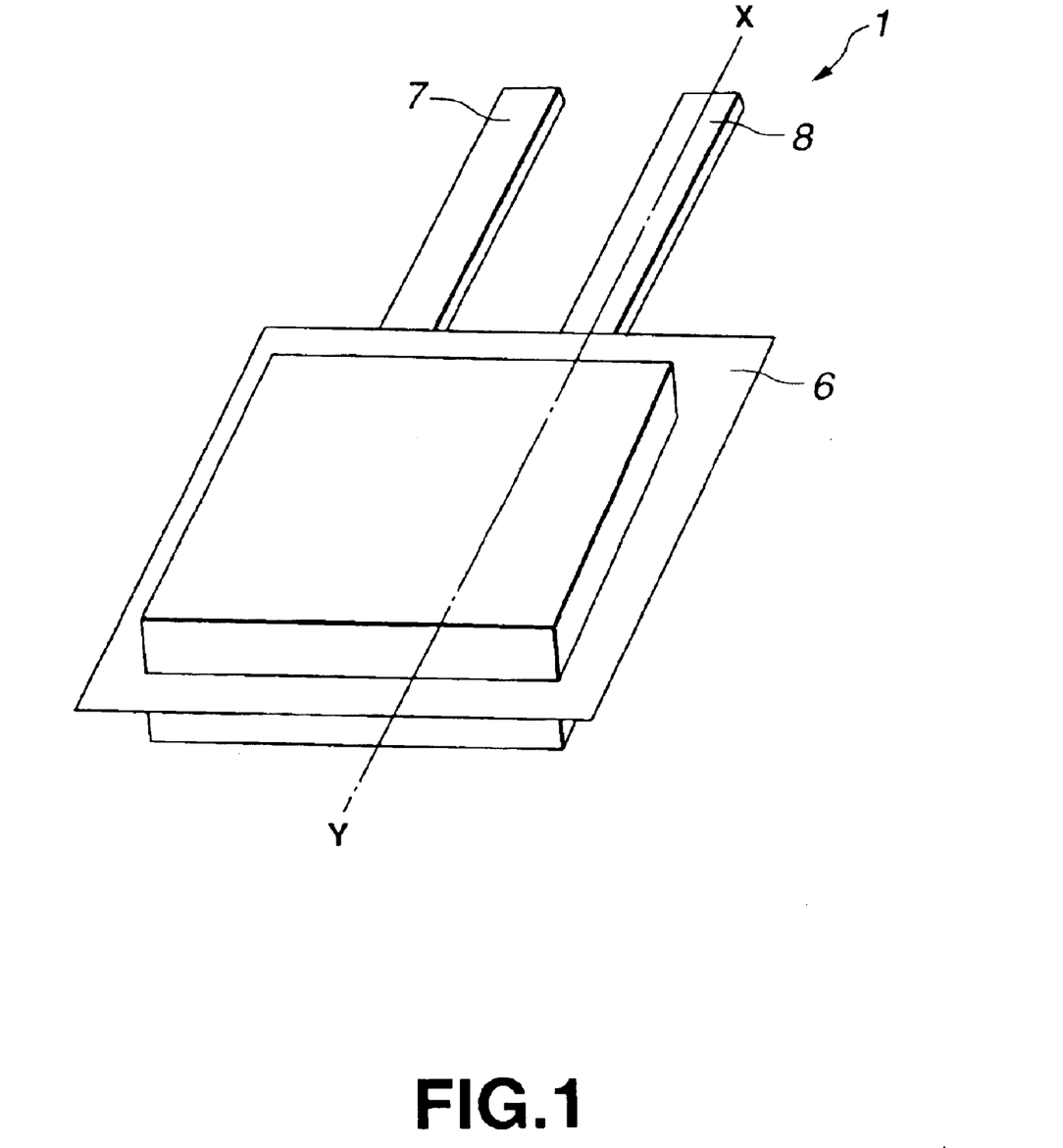
FIG. 1 is a perspective view showing a configuration example of a solid electrolyte cell according to the present invention.
Figure 2:
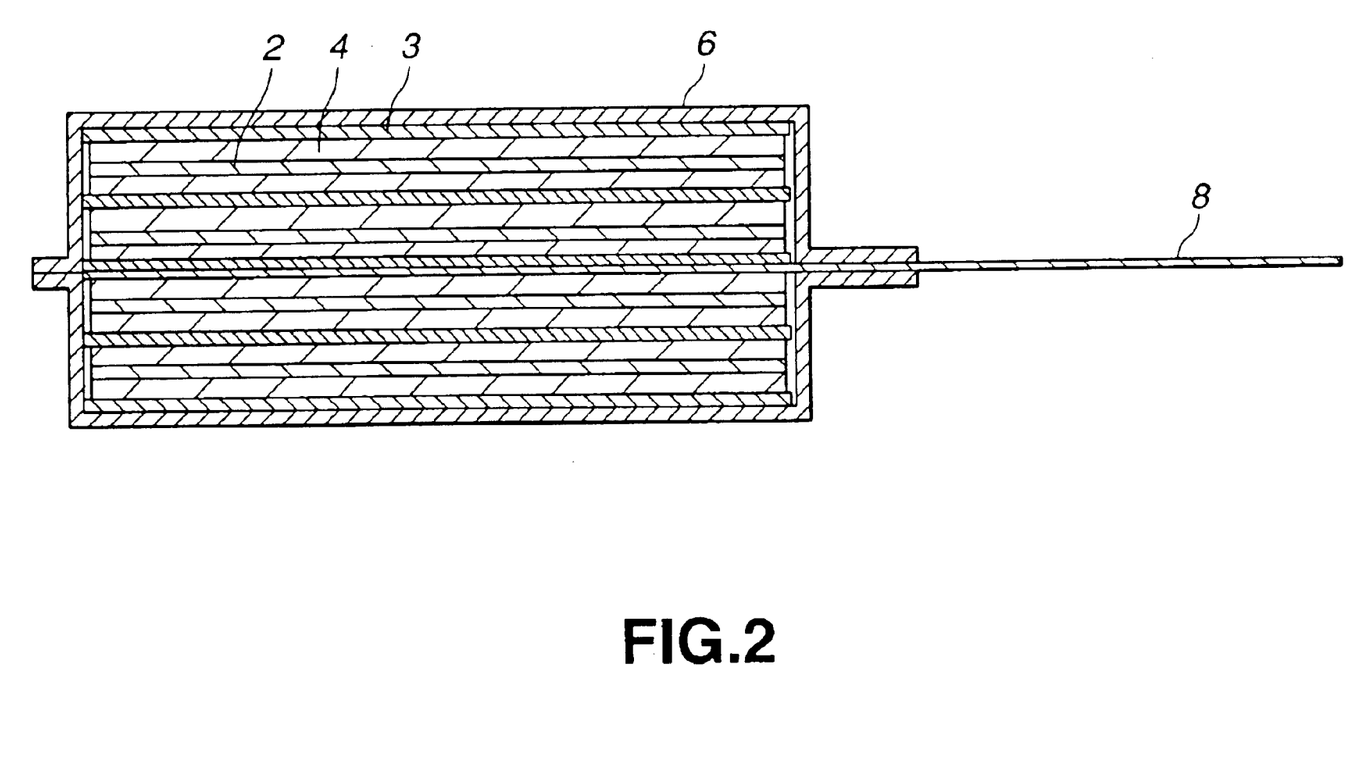
FIG. 2 is a cross sectional view about the line X–Y in FIG. 1.

FIG. 1 and FIG. 2 show a configuration example of the gel electrolyte cell produced according to the present invention. The gel electrolyte cell 1 includes a strip positive electrode 2, a strip negative electrode 3 arranged to oppose to the positive electrode 2, and a gel electrolyte film 4 arranged between the positive electrode 2 and the negative electrode 3. The positive electrode 2 and the negative electrode 3 are layered via the gel electrolyte film 4 and rolled in the longitudinal direction to obtain a rolled electrode body 5 shown in FIG. 3, which is covered and sealed in an exterior film 6 made from an insulation material. The positive electrode 2 is provided with a positive electrode terminal 7 and the negative electrode 3 is provided with a negative electrode terminal 8. The positive electrode terminal 7 and the negative electrode terminal 8 protrude through the sealing portion of the peripheral portion of the exterior film 6.

Figure 4:
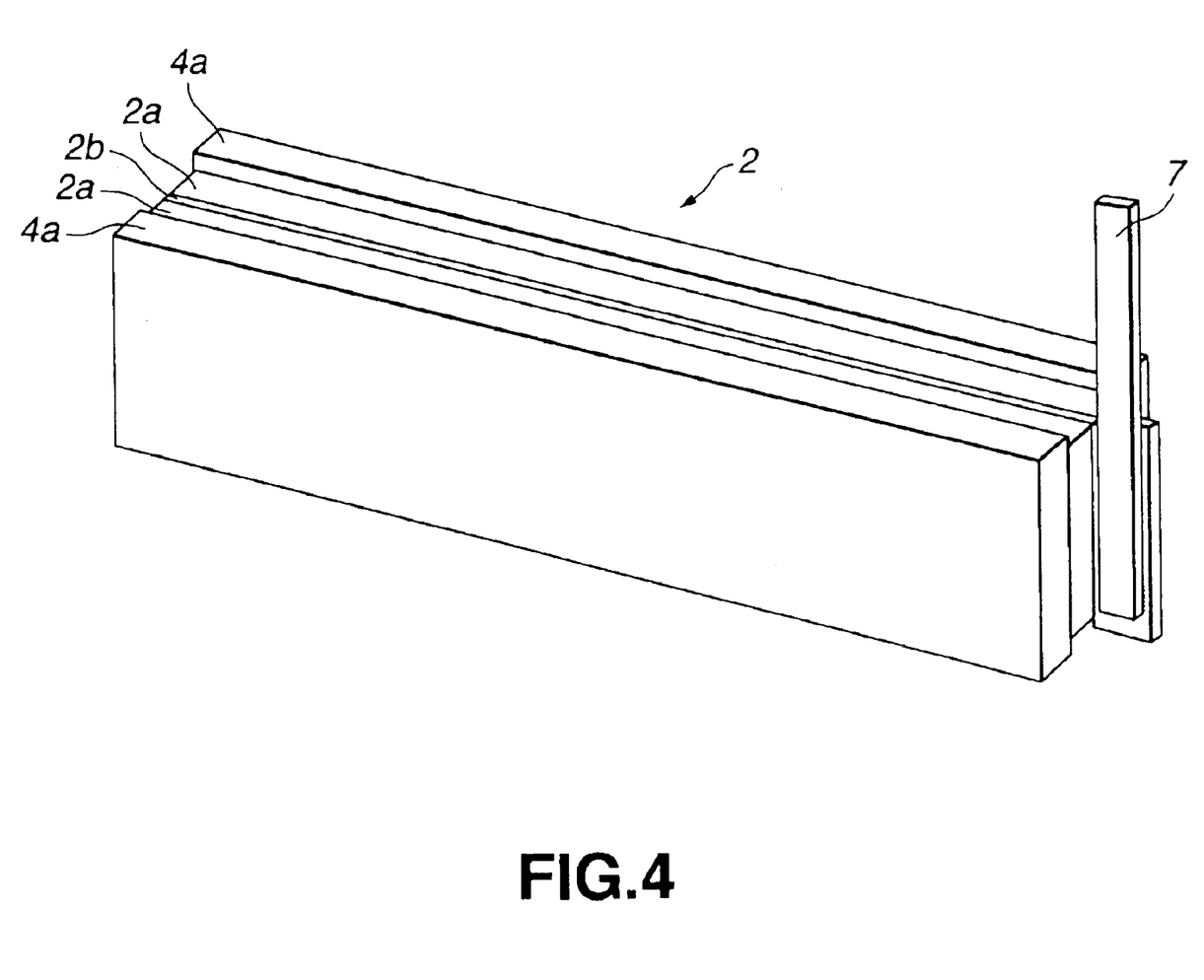
FIG. 4 is a perspective view showing a configuration example of the positive electrode.

As shown in FIG. 4, the positive electrode 2 includes a positive electrode active material layer 2a containing a positive electrode active material and is formed on both sides of a positive electrode collector 2b. The positive electrode collector 2b, for example, is made from a metal foil such as an aluminum foil.

For the positive electrode active material, it is possible to use a composite oxide such as lithium cobaltate, lithium nickelate, lithium manganate whose portion is substituted by a transition metal, or a transition metal compound such as manganese dioxide and vanadium pentoxide, or a transition metal chalcogen compound such as iron sulfide.

It should be noted that FIG. 4 shows a gel electrolyte film 4a, which will be detailed later, formed on the positive electrode active material layer 2a of the positive electrode 2.

Figure 5:
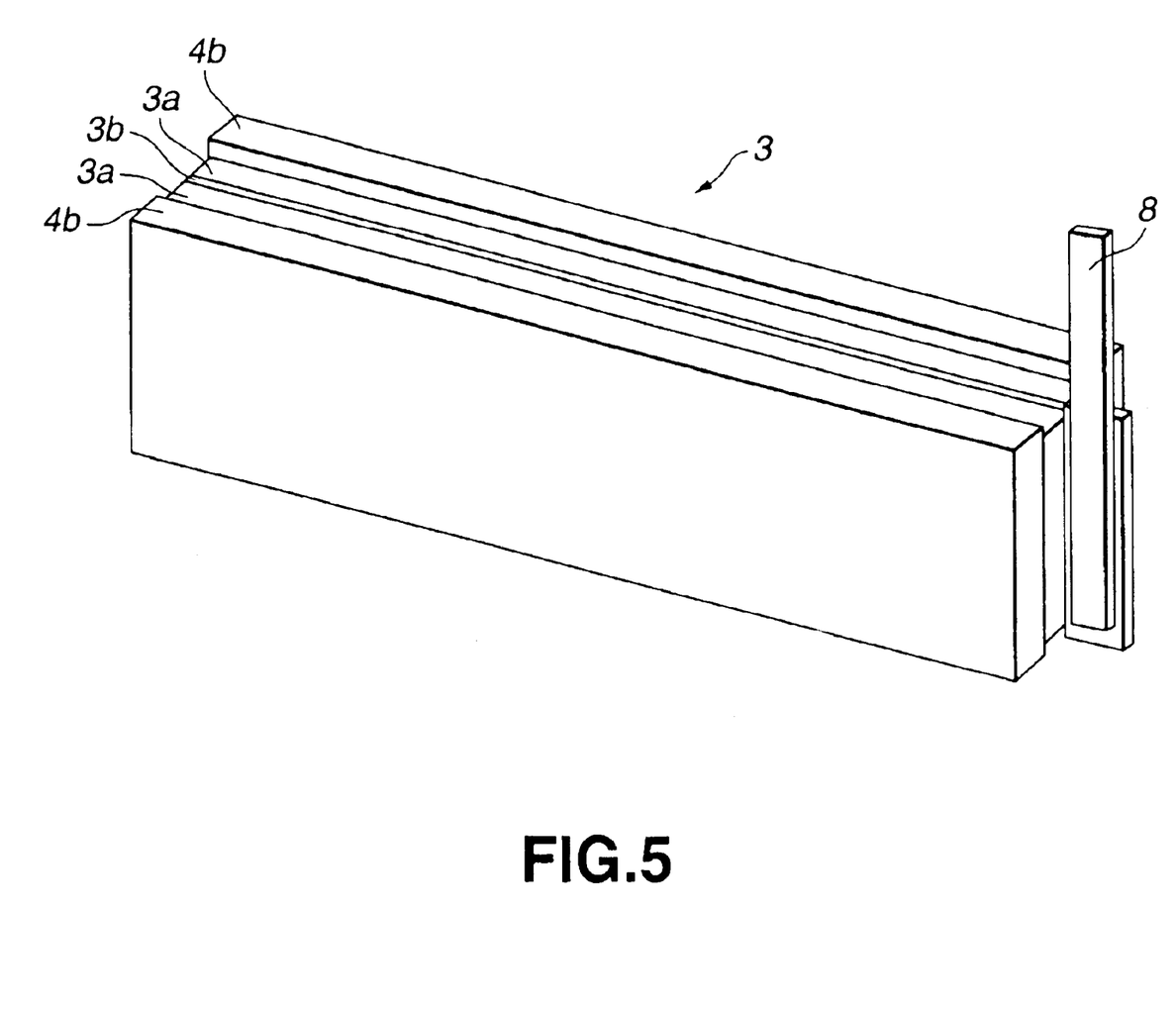
FIG. 5 is a perspective view showing a configuration example of the negative electrode.

Moreover, as shown in FIG. 5, the negative electrode 3 includes a negative electrode active material layer 3a containing a negative electrode active material formed on a negative electrode collector 3b. The negative electrode collector 3b is formed, for example, from a metal foil such as a copper foil.

The negative electrode active material may be a material capable of doping and dedoping, lithium. As the material capable of doping and dedoping lithium, there can be exemplified pyrocarbons, coke, acetylene black, other carbon black, graphite, glassy carbon, active carbon, carbon fiber, organic polymer sintered body, coffee beans sintered body, cellulose sintered body, bamboo sintered body, and other carbon materials, lithium metal, lithium alloy, or polyacetylene, and other conductive polymers.

It should be noted that FIG. 5 shows a gel electrolyte film 4b, which will be detailed later, formed on the negative active material layer 3a of the negative electrode 3.

The gel electrolyte film 4 contains an electrolyte salt, matrix polymer, and a swelling solvent as a plastic material.

For the electrolyte salt, it is possible to use $LiPF_6$, $LiAsF_6$, $LiBF_4$, $LiClO_4$, $LiCF_3SO_3$, $Li(CF_3SO_2)_2N$, $LiC_4F_9SO_3$, and the like solely or in combination with others.

The matrix polymer is not limited to a particular chemical structure if it shows ion conductance not less than 1 mS/cm at room temperature. As this matrix polymer, for example, it is possible to use polyacrylonitrile, polyvinylidene fluoride, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, and the like.

The swelling solvent may be ethylene carbonate, propylene carbonate, butylene carbonate, γ-butyrolactone, γ-valerolactone, diethoxyethane, tetrahydrofuran, 2-methyl tetrahydrofuran, 1,3-dioxane, methyl acetate, methyl propionate, dimethyl carbonate, diethyl carbonate, ethylmethyl carbonate, and other non-aqueous solvents. Each of these can be used solely or in combination with others.

Figure 3:
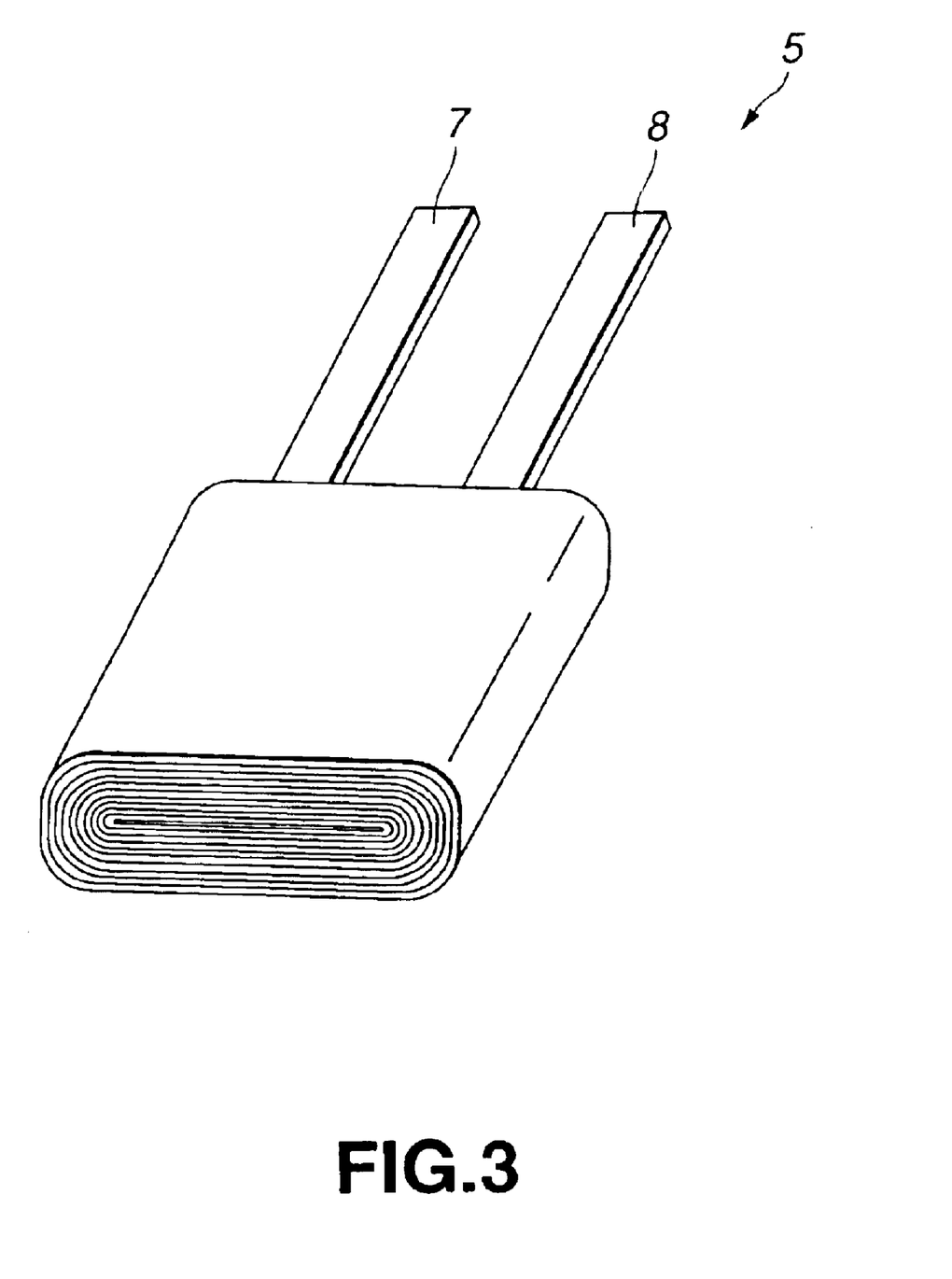
FIG. 3 is a perspective view of a positive electrode and a negative electrode which are formed into a rolled electrode body.

Here, as shown in FIG. 4, in the gel electrolyte cell 1 according to the present embodiment, the gel electrolyte film 4a is formed on the positive electrode active material layer 2a of the positive electrode 2 so as to have a larger width than the positive electrode 2. Moreover, as shown in FIG. 5, the gel electrolyte film 4b is formed on the negative electrode active material layer 3a of the negative electrode 3 so as to have a larger width than the negative electrode 3. In this gel electrolyte cell 1, as shown in FIG. 2 and FIG. 3, the positive electrode 2 and the negative electrode 3 are layered via the gel electrolyte film 4 and rolled in the longitudinal direction so as to obtain the rolled electrode body 5.

Next, explanation will be given on a production method of such a gel electrolyte cell 1.

Firstly, for the positive electrode 2, a positive electrode composite agent containing a positive electrode active material and a binder is uniformly applied on a metal foil such as an aluminum foil to serve as the positive electrode collector 2b and dried so as to obtain a positive electrode active material layer 2a. Thus, a positive electrode sheet is ready. The binder contained in the positive electrode composite agent may be selected from known binders with or without addition of known additives. The positive electrode sheet having the positive electrode active material layer 2a is cut into a predetermined width to obtain a positive electrode ribbon.

Next, the gel electrolyte film 4a is formed on the positive electrode active material layer 2a of the positive electrode ribbon. In order to form the gel electrolyte film 4, firstly, an electrolyte salt is dissolved in a non-aqueous solvent to prepare a non-aqueous electrolyte solution. A matrix polymer is added to this non-aqueous electrolyte solution and sufficiently agitated to dissolve the matrix polymer to obtain a sol electrolyte solution.

Next, a predetermined amount of this electrolyte solution is applied onto the positive electrode active material layer 2a, and cooled down at room temperature so that the matrix polymer is gelatinized. Thus, the gel electrolyte film 4a is formed on the positive electrode active material layer 2a.

It should be noted that the formation method of the gel electrolyte film on the positive electrode ribbon will be detailed later.

Next, the positive electrode ribbon having the gel electrolyte film 4a is cut into a predetermined length. The gel electrolyte film 4a and the positive electrode active material layer 2a of a portion to which a positive electrode lead is to be welded are removed and a lead made from, for example, aluminum is welded here to serve as a positive electrode terminal 7. Thus, a strip positive electrode 2 having the gel electrolyte film 4a is obtained.

Moreover, for the negative electrode 3, a negative electrode composite agent containing a negative electrode active material and a binder is uniformly applied on a metal foil such as a copper foil to serve as the negative electrode collector 3b and dried so as to obtain a negative electrode active material layer 3a. Thus, a negative electrode sheet is ready. The binder contained in the negative electrode composite agent may be selected from known binders with or without addition of known additives. The negative electrode sheet having the negative electrode active material layer 3a is cut into a predetermined width to obtain a negative electrode ribbon.

Next, the gel electrolyte film 4b is formed on the negative electrode active material layer 3a of the negative electrode ribbon. In order to form the gel electrolyte film 4, firstly, a predetermined amount of the electrolyte solution prepared in the same way as the aforementioned is applied onto the negative electrode active material layer, and cooled down at room temperature so that the matrix polymer is gelatinized. Thus, the gel electrolyte film 4b is formed on the negative electrode active material layer 3a.

It should be noted that the formation method of the gel electrolyte film on the negative electrode ribbon will be detailed later.

Next, the negative electrode ribbon having the gel electrolyte film 4b is cut into a predetermined length. The gel electrolyte film 4b and the negative electrode active material layer 3a of a portion to which a negative electrode lead is to be welded are removed and a lead made from, for example, nickel is welded here to serve as a negative electrode terminal 8. Thus, a strip negative electrode 3 having the gel electrolyte film 4b is obtained.

The strip positive electrode 2 and the strip negative electrode 3 are attached to each other so that the gel electrolyte films 4a and 4b face to each other and pressed to obtain a layered electrode body. Furthermore, this layered electrode body is rolled in the longitudinal direction to obtain a rolled electrode body 5.

Lastly, the rolled electrode body 5 is packed in an exterior film 6 made from an insulation material so that the positive electrode terminal 7 and the negative electrode terminal 8 protrude through the seal portions. Thus, the gel electrolyte cell 1 is. complete.

Next, explanation will be given on the formation method of the gel electrolyte film on the positive electrode ribbon and the negative electrode ribbon. It should be noted that explanation will be given on the case of forming the gel electrolyte film on the positive electrode ribbon as an example, but this can applied to the case when forming the gel electrolyte film on the negative electrode ribbon.

Figure 6:
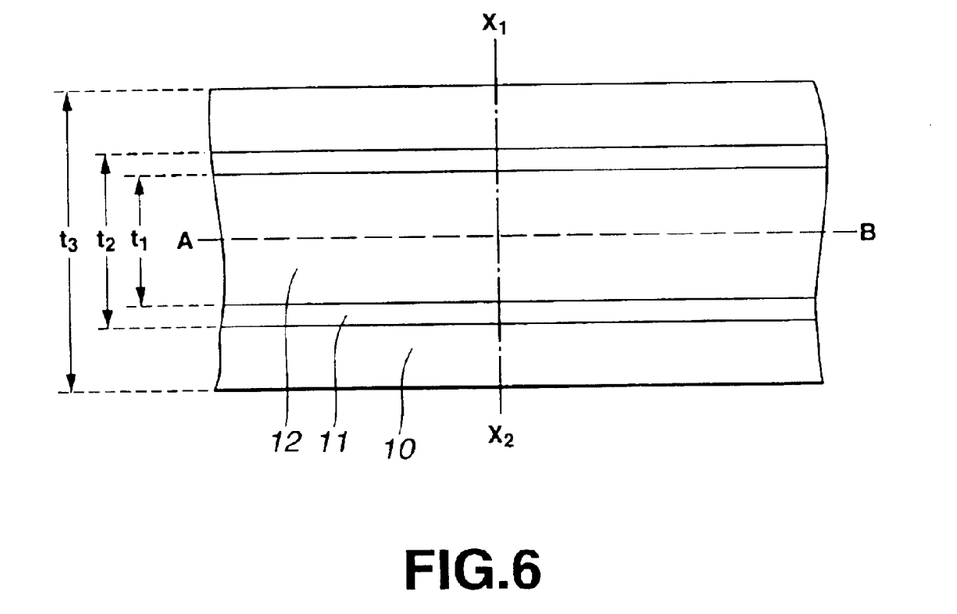
FIG. 6 explains a gel electrolyte film formation method according to the present invention with a plan view of a flat plate, a carrier, and a positive electrode ribbon placed on one another.
Figure 7:
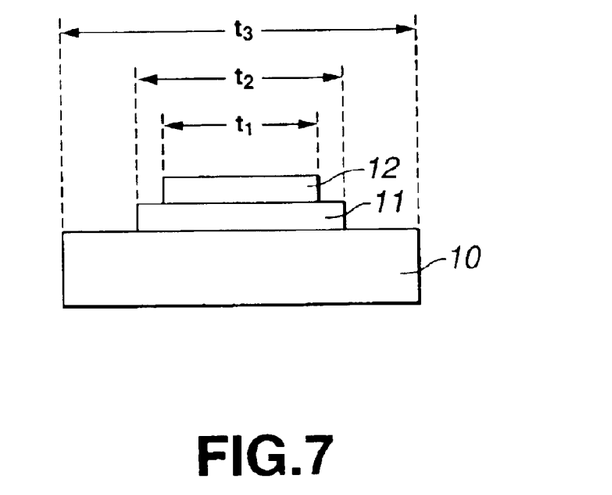
FIG. 7 is a cross sectional view about the line $X_1$–$X_2$ in FIG. 6.

Firstly, as shown in FIG. 6 and FIG. 7, a flat plate 10, a carrier 11, and a positive electrode ribbon 12 are placed upon one another in this order. Here, the flat plate 10, the carrier 11, and the positive electrode ribbon 12 are placed so that the center lines, as shown at the line A–B in FIG. 6, in the longitudinal direction of the flat plate 10, the carrier 11, and the positive electrode ribbon 12 are matched with one another.

The flat plate 10 has a width $t_3$ greater than the width $t_1$ of the positive electrode ribbon 12 and the width of the gel electrolyte film formed on the positive electrode ribbon 12.

Here, the flat plate 10 may be made from any material if it has adhesion with the gel electrolyte film higher than the adhesion between the carrier 11 and the gel electrolyte film. The flat plate 10 may be made from, for example, metal or glass.

Moreover, the carrier 11 has a width $t_2$ approximately equal to the width of a gel electrolyte film 13a formed on the positive electrode ribbon 12. That is, the width $t_2$ of the carrier 11 is greater than the width $t_1$ of the positive electrode ribbon 12 and smaller than the width $t_3$ of the flat plate 10. Moreover, the flat plate 11 has a thickness as small as possible while a desired strength can be obtained.

Here, the material of the carrier 11 is not limited to a particular material under the condition that the adhesion with the gel electrolyte film is lower than the adhesion between the positive electrode ribbon 12 and the gel electrolyte film. The carrier 11 may be preferably made from a material such as metal or synthetic resin.

Figure 8:
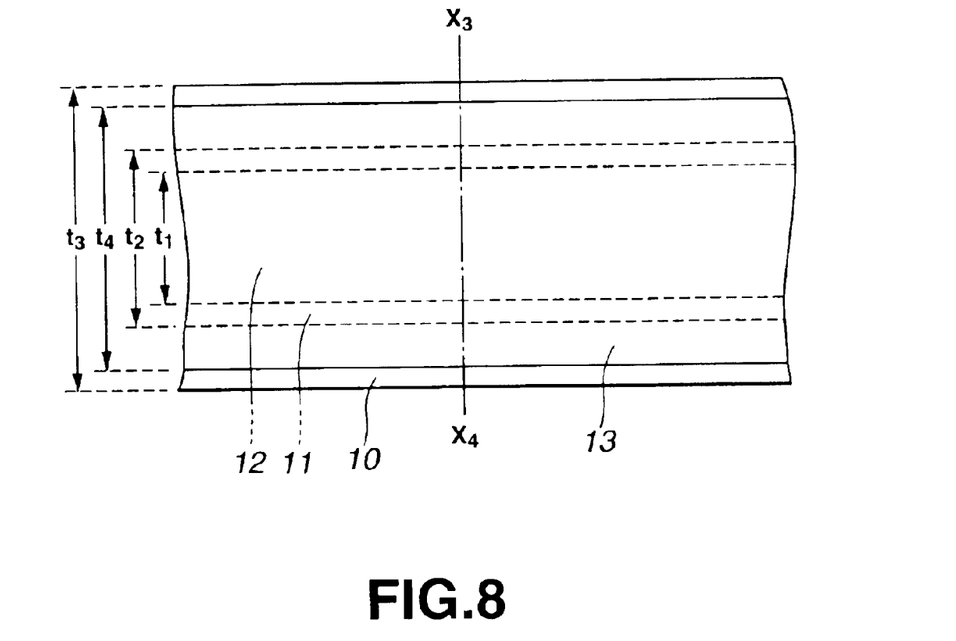
FIG. 8 explains the gel electrolyte film formation method according to the present invention with plan view of an electrolyte solution applied to the flat plate, the carrier, and the positive electrode ribbon which are placed on one another.
Figure 9:
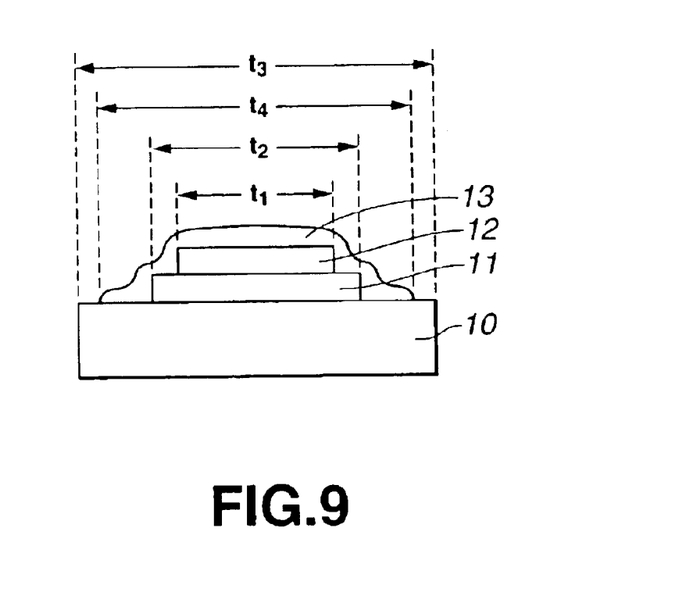
FIG. 9 is a cross sectional view about the line $X_3$–$X_4$ in FIG. 8.

Next, as shown in FIG. 8 and FIG. 9, the sol electrolyte solution 13 is applied onto the layered flat plate 10, the carrier 11, and the positive electrode ribbon 12. Here, the electrolyte solution 13 is applied so as to have a coating width $t_4$ greater than the width $t_2$ of the carrier 11 and smaller than the width $t_3$ of the flat plate 10.

Figure 10:
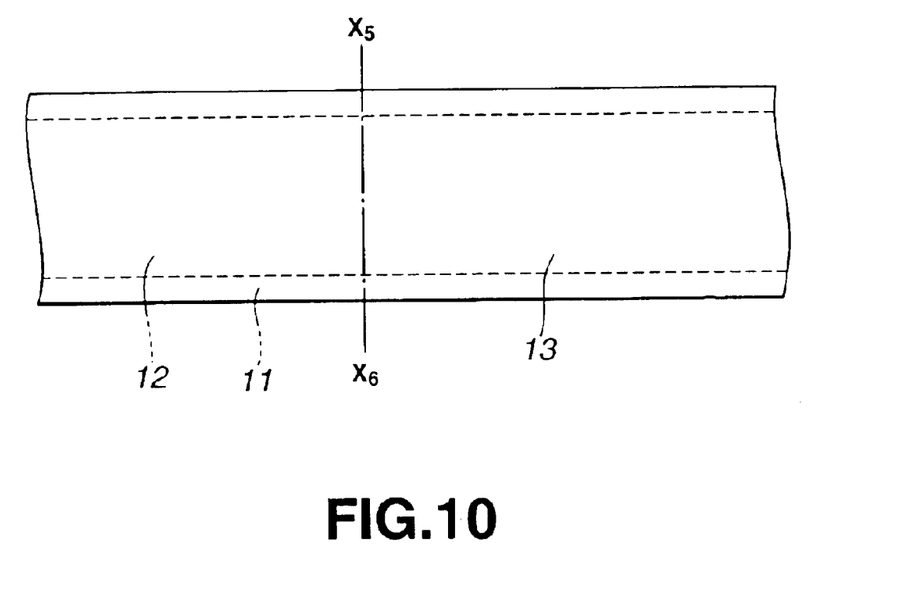
FIG. 10 explains the gel electrolyte film formation method according to the present invention with a plan view showing a state after the carrier and the positive electrode ribbon are peeled off from the flat plate.
Figure 11:
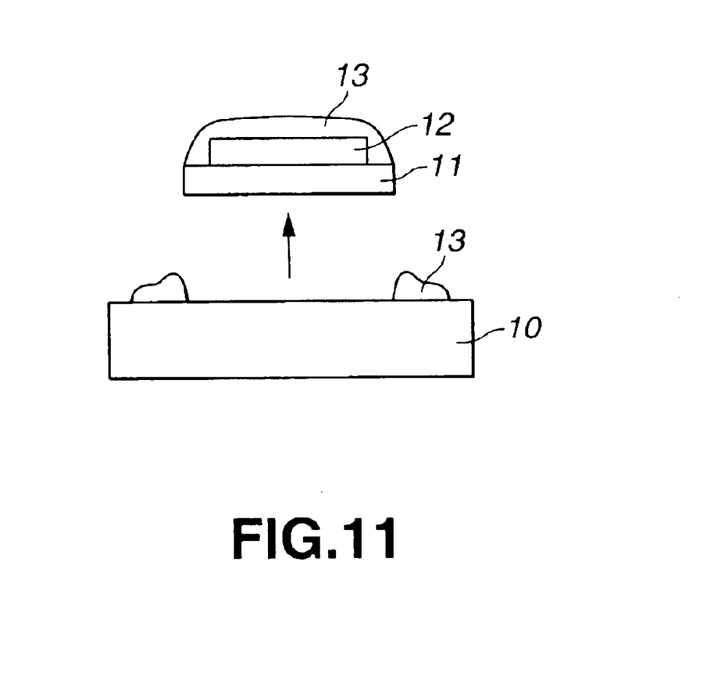
FIG. 11 is a cross sectional view about the line $X_5$–$X_6$ in FIG. 10.

Next, as shown in FIG. 10 and FIG. 11, with the electrolyte solution 13 applied to the layered flat plate 10, the carrier 11, and the positive electrode ribbon 12, the carrier 11 and the positive electrode ribbon 12 are peeled off from the flat plate 10.

Here, as has been described above, the adhesion between the gel electrolyte film and the flat plate 10 is higher than that between the gel electrolyte film and the carrier 11. Accordingly, the portion of the electrolyte solution 13 on the flat plate 10 and protruding from the carrier 11, i.e., the electrolyte solution 13 coated out of the carrier 11 is adhered to the flat plate 10 and remains there. As a result, on the carrier 11, over the positive electrode ribbon 12 placed on the carrier 11, the electrolyte solution 13 remains with an approximately identical width as the carrier 11.

Next, the sol electrolyte solution 13 applied onto the carrier 11 and the positive electrode ribbon 12 is gelatinized to form the gel electrolyte film 13a.

Figure 12:
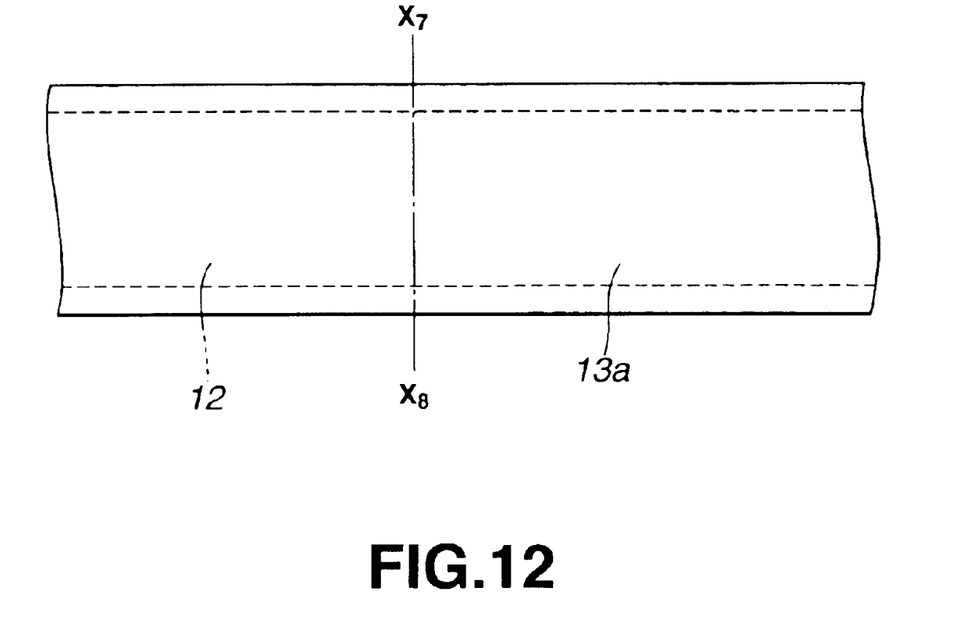
FIG. 12 explains the gel electrolyte film formation method according to the present invention with a plan view showing a state after the positive ribbon is peeled off from the carrier.
Figure 13:
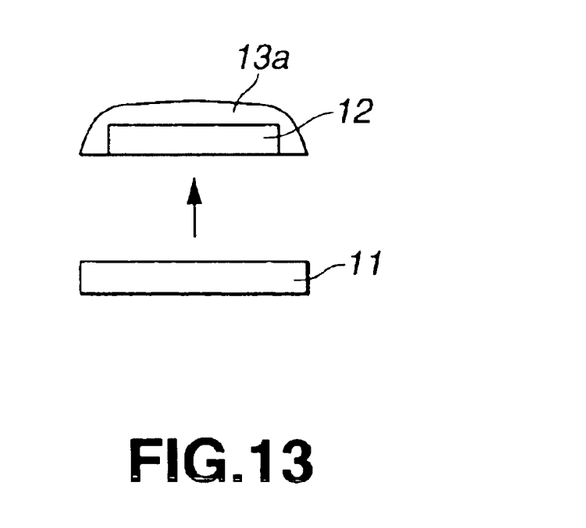
FIG. 13 is a cross sectional view about the line $X_7$–$X_8$ in FIG. 12.

Lastly, as shown in FIG. 12 and FIG. 13, the positive electrode ribbon 12 and the gel electrolyte film 13a are peeled off from the carrier 11. Here, as has been described above, since the adhesion between the gel electrolyte film 13a and the positive electrode ribbon 12 is higher than that between the gel electrolyte film 13a and the carrier 11, the portion of the gel electrolyte film 13a on the carrier 11 and protruding from the width of the positive electrode ribbon 12, i.e., formed out of the positive electrode ribbon 12 is peeled off from the carrier 11 together with the positive electrode ribbon 12 due to the difference in the adhesion.

As has been described above, the gel electrolyte film 13a is formed on the positive electrode ribbon 12 so as to have a width greater than that of the positive electrode ribbon 12.

In the aforementioned method utilizing the adhesion difference between the flat plate 10, the carrier 11, and the gel electrolyte film 13a, it is possible to form the gel electrolyte film 13a on the positive electrode ribbon 12 with a high accuracy without danger of peeling off of the gel electrolyte film 13a from the positive electrode ribbon 12. Accordingly, in the aforementioned method, there is no danger of removal of the gel electrolyte film 13a which is to remain or mixing of a cut off portion of the gel electrolyte film 13a into the product.

Moreover, in the aforementioned method, the gel electrolyte film 13a is formed with a width approximately identical to the width of the carrier 11. Accordingly, by adjusting the width of the carrier 11, it is possible to obtain a desired width of the gel electrolyte film 13a without difficulty.

It should be noted that while explanation has been given on the embodiment of a cell using a strip positive electrode and a strip negative electrode are layered via a gel electrolyte film and rolled into the longitudinal direction into a rolled electrode body, the present invention is not to be limited to this example. The present invention can also be applied to a case when the strip positive electrode and the strip negative electrode layered via the gel electrolyte film are folded instead of being rolled to obtain an electrode body or to a case when a rectangular positive electrode and a rectangular negative electrode are layered via a gel electrolyte film to obtain a layered electrode body.

Moreover, the gel electrolyte cell 1 according to the aforementioned embodiment is not to be limited to a particular shape such as a circular shape, angular shape and the like. Moreover, the gel electrolyte cell 1 may be a thin type, large-size type, or the like. Moreover, the present invention can be applied to a primary cell as well as to a secondary cell.

EXAMPLE

In order to confirm the effect of the present invention, a gel electrolyte film was formed on an electrode ribbon according to the aforementioned method.

Firstly, an electrode ribbon was placed on a carrier in such a manner that their centers in the width directions coincide and rolled into a rolled electrode body.

Here, the carrier used was polypropylene film having a length of 200 m, width of 62 mm, and thickness of 0.05 mm. Moreover, the electrode ribbon had a length of 150 m, width of 60 mm, and thickness of 0.15 mm.

The layered body of the carrier and the electrode ribbon was made to travel along a surface of a coating drum having a width of 100 mm while an electrolyte solution was applied onto the surface of the carrier and the electrode ribbon with a thickness of 20 μm using a doctor blade apparatus. The doctor blade apparatus had a discharge opening width of 70 mm.

That is, the electrolyte solution was applied onto the carrier and the electrode ribbon so as to have a width smaller than the width of the coating drum and greater than the width of the carrier.

When the electrolyte coating is complete and the electrode is removed from the coating drum, the carrier and the electrode ribbon are peeled off from the coating drum. Here, the electrolyte solution of the portion out of the width of the carrier remained on the coating drum surface, which was removed by a scraper in contact with the coating roll.

After that, the electrolyte solution was gelatinized to form a gel electrolyte film and the electrode ribbon was peeled off from the carrier. Thus, a gel electrolyte film was formed on the electrode ribbon so as to protrude in the width direction by 1.0 mm at both sides.

By forming the gel electrolyte film as has been described above, it was possible to produce a desired gel electrolyte film without removing a gel electrolyte film portion to be left or mixing a cut-off gel film into the product to lower the yield.

Since the present invention utilizes the adhesion difference between the electrode carrier, the first carrier, the second carrier, and the gel electrolyte film, there is no danger of peeling off of the gel electrolyte film from the electrode carrier and it is possible to form a gel electrolyte film on the electrode carrier with a high accuracy. Accordingly, in this invention, there is no danger of removal of a gel electrolyte film portion to be left or mixing of a cut-off gel electrolyte film into the product.

Thus, the present invention can form an excellent electrode and a gel electrolyte cell having a high reliability.

What is claimed is:

1. A method for producing an electrode including a rectangular electrode carrier and a gel electrolyte film formed on the electrode carrier and having a width greater than the electrode carrier, the method comprising the steps of:
   overlaying a first carrier having a greater width than the gel electrolyte film, a second carrier having a width approximately identical to that of the gel electrolyte film, and the electrode carrier in this order,
   applying an electrolyte composition onto the first carrier, the second carrier, and the electrode carrier which have been overlaid upon one another, in such a manner that the applied electrolyte composition has a width greater than the width of the second carrier and smaller than the width of the first carrier,
   peeling off, from the first carrier, the second carrier and the electrode carrier coated with the applied electrolyte composition,
   forming into the gel electrolyte film the electrolyte composition applied onto the second carrier and the electrode carrier which have been peeled off from the first carrier, and
   peeling off from the second carrier the electrode carrier and the gel electrolyte film formed of the electrolyte composition.

2. The method of claim 1, wherein the electrolyte composition is applied in a sol state.

3. The method of claim 2, wherein the electrolyte composition contains an electrolyte salt, matrix polymer, and a swelling solvent.

4. The method of claim 3, wherein the electrolyte salt is further defined as being selected from the group consisting of $LiPF_6$, $LiAsF_6$, $LiClO_4$, $LiCF_3SO_3$, $Li(CF_3SO_2)_2N$, and $LiC_4F_9SO_3$.

5. The method of claim 3, wherein the matrix polymer is further defined as being selected from the group consisting of polyacrylonitrile, polyvinylidene fluoride, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate.

6. The method of claim 3, wherein the swelling solvent is further defined as being selected from the group consisting of ethylene carbonate, propylene carbonate, butylene carbonate, γ-butyrolactone, γ-valerolactone, diethoxyethane, tetrahydrofuran, 2-methyl tetrahydrofuran, 1,3-dioxane, methyl acetate, methyl propionate, dimethyl carbonate, diethyl carbonate, and ethylmethyl carbonate.

7. The method of claim 1, wherein in the step of peeling off the second carrier and the electrode carrier coated with the applied electrolyte composition from the first carrier, the first carrier has an adhesion with the electrolyte composition higher than an adhesion between the second carrier and the electrolyte composition.

8. The method of claim 1, wherein in the step of peeling off the electrode carrier and the gel electrolyte film formed of the electrolyte composition from the second carrier, the second carrier has an adhesion with the gel electrolyte film lower than an adhesion between the electrode carrier and the gel electrolyte film.

9. The method of claim 8, wherein the second carrier consists of a synthetic resin.

10. The method of claim 9, wherein the synthetic resin consists of propylene.

11. A method for producing a gel electrolyte cell, the method comprising the steps of:
    forming an electrode including a rectangular electrode carrier and a gel electrolyte film formed on the electrode carrier and having a width greater than the electrode carrier by:
    overlaying a first carrier having a greater width than the gel electrolyte film, a second carrier having a width approximately identical to that of the gel electrolyte film, and the electrode carrier in this order,
    applying an electrolyte composition onto the first carrier, the second carrier, and the electrode carrier which have been overlaid upon one another, in such a manner that the applied electrolyte composition has a width greater than the width of the second carrier and smaller than the width of the first carrier,
    peeling off, from the first carrier, the second carrier and the electrode carrier coated with the applied electrolyte composition,
    forming into the gel electrolyte film the electrolyte composition applied onto the second carrier and the electrode carrier which have been peeled off from the first carrier, and
    peeling off from the second carrier the electrode carrier and the gel electrolyte film formed of the electrolyte composition; and
    producing the gel electrolyte cell including the formed electrode,
    wherein the electrolyte composition is applied in a sol state,
    wherein the electrolyte composition contains an electrolyte salt, a matrix polymer, and a swelling solvent, and
    wherein the matrix polymer is further defined as being selected from the group consisting of polyhexafluoropropylene, polypropylene oxide, polyphosphazene, polysiloxane, polyacrylic acid, polymethacrylic acid, styrene-butadiene rubber, nitrile-butadiene rubber, and polycarbonate.

12. The method for producing a gel electrolyte cell of claim 11, wherein the electrolyte salt is further defined as being selected from the group consisting of $LiPF_6$, $LiAsF_6$, $LiClO_4$, $LiCF_3SO_3$, $Li(CF_3SO_2)_2N$, and $LiC_4F_9SO_3$.

13. The method for producing a gel electrolyte cell of claim 11, wherein the swelling solvent is further defined as being selected from the group consisting of ethylene carbonate, propylene carbonate, butylene carbonate, γ-butyrolactone, γ-valerolactone, diethoxyethane, tetrahydrofuran, 2-methyl tetrahydrofuran, 1,3-dioxane, methyl acetate, methyl propionate, dimethyl carbonate, diethyl carbonate, and ethylmethyl carbonate.

14. The method for producing a gel electrolyte cell of claim 11, wherein in the step of peeling off the second carrier and the electrode carrier coated with the applied electrolyte composition from the first carrier, the first carrier has an adhesion with the electrolyte composition higher than an adhesion between the second carrier and the electrolyte composition.

15. The method for producing a gel electrolyte cell of claim 11, wherein in the step of peeling off the electrode carrier and the gel electrolyte film formed of the electrolyte composition from the second carrier, the second carrier has an adhesion with the gel electrolyte film lower than an adhesion between the electrode carrier and the gel electrolyte film.

16. The method for producing a gel electrolyte cell of claim 15, wherein the second carrier consists of a synthetic resin.

17. The method for producing a gel electrolyte cell of claim 16, wherein the synthetic resin consists of propylene.

18. A method for producing a gel electrolyte cell, the method comprising the steps of:

forming an electrode including a rectangular electrode carrier and a gel electrolyte film formed on the electrode carrier and having a width greater than the electrode carrier by:

overlaying a first carrier having a greater width than the gel electrolyte film, a second carrier having a width approximately identical to that of the gel electrolyte film, and the electrode carrier in this order, applying an electrolyte composition onto the first carrier, the second carrier, and the electrode carrier which have been overlaid upon one another, in such a manner that the applied electrolyte composition has a width greater than the width of the second carrier and smaller than the width of the first carrier, peeling off, from the first carrier, the second carrier and the electrode carrier coated with the applied electrolyte composition, forming into the gel electrolyte film the electrolyte composition applied onto the second carrier and the electrode carrier which have been peeled off from the first carrier, and peeling off from the second carrier the electrode carrier and the gel electrolyte film formed of the electrolyte composition; and producing the gel electrolyte cell including the formed electrode.

* * * * *